(12) United States Patent
Lu et al.

(10) Patent No.: US 7,344,311 B2
(45) Date of Patent: Mar. 18, 2008

(54) SUSPENSION JOINT BEARING

(75) Inventors: Jian Lu, Ballwin, MO (US); George Schmidt, St. Louis, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 188 days.

(21) Appl. No.: 10/802,641

(22) Filed: Mar. 16, 2004

(65) Prior Publication Data

US 2005/0207684 A1 Sep. 22, 2005

(51) Int. Cl.
*F16C 23/04* (2006.01)
*F16C 23/08* (2006.01)
*F16C 25/04* (2006.01)

(52) U.S. Cl. .................. 384/206; 384/204; 384/192

(58) Field of Classification Search ........... 384/192, 384/202, 203, 206, 207, 208, 209, 211, 220, 384/215, 222, 297, 299, 300, 213; 403/141, 403/142, 135; 267/140, 152, 153
See application file for complete search history.

(56) References Cited

U.S. PATENT DOCUMENTS

| | | | | |
|---|---|---|---|---|
| 2,900,196 A | * | 8/1959 | Nienke | 280/86.756 |
| 2,931,477 A | * | 4/1960 | Metzgar | 193/35 MD |
| 3,226,141 A | * | 12/1965 | Sullivan, Jr. | 403/135 |
| 4,372,621 A | * | 2/1983 | Farrant | 384/2 |
| 4,511,277 A | | 4/1985 | McCabe | |
| 4,537,524 A | | 8/1985 | Hanson | |
| 4,577,989 A | | 3/1986 | Ito | |
| 4,591,276 A | * | 5/1986 | Schneider et al. | 384/206 |
| 5,326,178 A | * | 7/1994 | Strobl | 384/192 |
| 5,395,176 A | | 3/1995 | Zivkovic | |
| 5,630,672 A | | 5/1997 | McHale | |
| 5,961,219 A | * | 10/1999 | Maughan | 384/220 |
| 6,164,829 A | * | 12/2000 | Wenzel et al. | 384/203 |

\* cited by examiner

*Primary Examiner*—Thomas R. Hannon
*Assistant Examiner*—Justin Krause
(74) *Attorney, Agent, or Firm*—Robert L. Stearns; Dickinson Wright PLLC

(57) ABSTRACT

An improved bearing for use in movable sockets and suspension joints. The improved bearing is annular, having an outer dimension sized to seat within the housing of a suspension joint or movable socket. An inner surface of the bearing is configured to receive the head of an articulating stud within the housing. Three or more radial slots are disposed on the inner surface. Each radial slot disposed on one-half of the bearing inner surface has a unique radial dimension, such that the radial slots are optimally configured to minimize stress and stiffness within the improved bearing, whereby the bearing can be seated within the housing in a radially and rotationally locked configuration, but remain movable in an axial direction.

17 Claims, 3 Drawing Sheets

SUSPENSION JOINT BEARING

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to suspension joint bearings, and in particular, to an improved suspension joint bearing having non-uniform lubrication and stress-relief slots disposed in optimized locations about a circumference thereof to permit axial movement and simultaneous radial lock-up within a bearing housing.

Conventional suspension joints, and other movable sockets are used, for example, in automotive steering and suspension applications. The sockets comprise a housing having a circular cylindrical or conical internal surface, a ball stud with a stud head contained in the housing, and one or more bearing members supporting the stud head within the housing. Traditionally, the bearing members are composed of a synthetic resin or sintered alloy. These components are installed into the housing through an opening, with the stud extending outward through an axially disposed opening which may either be the same opening through which the components were installed, or an axially opposite opening.

Traditionally, if two openings are present in the housing, one opening is closed by means of a cover-plate, spun, swaged, or welded in place. Once secured in place, the cover-plate presses on the bearing members either directly or indirectly through a resilient rubber or elastic steel intermediate component. Alternatively, for housings having only a single opening, once the components are in place, and the ball stud is protruding from the opening, the peripheral edges of the opening are swagged or rolled to retain the components in place, while simultaneously permitting movement of the ball stud.

Conventional bearing components within the housing, against which the stud head or moveable component is rotated and/or articulated, perform best when the sliding surfaces are fully hardened, as it is better able to withstand the stresses and frictional wear associated with movement of the conventional bearing components. Bearing components in a movable socket are subjected to rotational, axial, and radial loads. Accordingly, the use of hardened materials greatly extends the useful life of the bearing components and the housing.

Once assembled, movable sockets may be utilized as load carrying members in numerous mechanical systems, including automotive vehicle suspension and steering systems. Movable sockets or ball-joints employed in these applications are subjected to various operating conditions, and may be required to carry substantial loads. When wear develops, the performance of the movable socket or ball-joint degrades and, in the case of automotive applications, may result in erratic steering or excessive looseness and play in the vehicle suspension system. Accordingly, it is desired to minimize internal wear in the movable sockets or suspension joints.

A conventional lower bearing in a suspension joint typically includes a number of equidistantly spaced radial slots of uniform depth. These slots are intended to provide a limited degree of flexibility in the bearing, and to provide channels for the flow of lubricant to the bearing surfaces in the suspension joint, reducing internal wear and extending the operational life of the suspension joint. This configuration of radial slots either has a very high stress associated with the radial slots, or a very high stiffness. If the bearing has a high stress associated with the radial slots, the bearing may break during the process of assembling the suspension joint or during subsequent operation thereof. If the bearing has a high stiffness, two possible problems may arise. First, if the outer radial dimension of the bearing is greater than the inner radial dimension of the housing in which it is seated, the bearing may be difficult to fit within the housing during assembly. Once assembled in the housing, the bearing may become "locked" against movement in the suspension joint axial direction, rendering other axial compliance members, such as Belleville washers, disposed within the housing non-functional. Alternatively, if the outer radial dimension of the bearing is smaller than the inner radial dimension of the housing, the bearing will be loose within the housing in a radial direction. A loose bearing will rotate within the housing during service and create impact forces in the housing, greatly decreasing the useful life of the suspension joint.

Accordingly, it is desirable to provide an improved socket lower bearing which retains the functionality of providing flexibility in a radial direction, delivering lubricant to the bearing surfaces, but which is minimally stressed, and which is configured to remain "locked" against rotational movement direction while simultaneously permitting movement in an axial direction.

BRIEF SUMMARY OF THE INVENTION

Briefly stated, the present invention provides an improved bearing for use in movable sockets and suspension joints. The improved bearing is annular, having an outer dimension sized to seat within the housing of a suspension joint or movable socket. An inner surface of the bearing is generally hemispherically or conically configured to receive the head of an articulating stud within the housing. Three or more radial slots are disposed in the inner surface. The radial slots each have non-uniform radial dimensions, and are optimally configured to minimize stress and stiffness within the improved bearing, whereby the bearing can be seated within the housing in a radially locked configuration, but remain movable in an axial direction.

In an alternate embodiment of the present invention, an improved lower bearing for use in a suspension joint is provided. The improved lower bearing is annular, having an outer dimension sized to seat within the housing of a suspension joint or movable socket. An inner surface of the bearing is generally hemispherically or conically configured to receive the head of an articulating stud within the housing. Five radial slots are symmetrically disposed in the inner surface, together with a break or discontinuity in the annular form. A first radial slot is provided with a first radial dimension. A first pair of adjacent radial slots are disposed on each side of the first radial slot, and are configured with a second radial dimension which is greater than the first radial dimension. A second pair of radial slots, disposed axially opposite the first pair of adjacent radial slots are configured with a third radial dimension which is greater than the second radial dimension. The break or discontinuity in the annular form of the bearing is disposed axially opposite the first radial slot. Each of the radial slots and discontinuity are optimally configured to minimize stress and stiffness within the improved bearing, whereby the bearing can be seated within the housing in a radially locked configuration, but remain movable in an axial direction.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
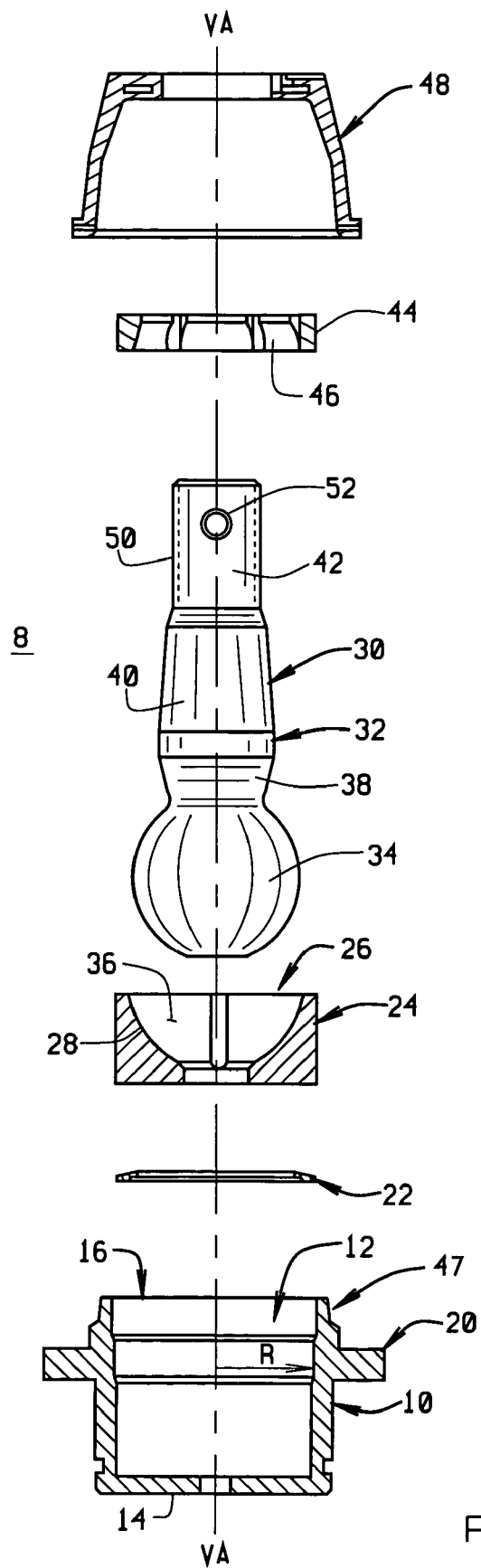
FIG. 1 is an exploded sectional view of a conventional ball and socket joint.

Turning to FIG. 1, a conventional suspension joint 8 is shown in an exploded view. A housing 10, within which the various internal components of the ball-joint 8 are enclosed, is generally cylindrical, with a central bore 12 of non-uniform radius R, having a closed posterior end 14 and an open anterior end 16. The exterior surface 18 of housing 10 may follow the general contour of the central bore 12. In the embodiment illustrated, the surface 18 has an annular flange 20 formed in it. The flange 20 is used to limit engagement of ball-joint 10 to other components (not shown). As may be appreciated, the flange 20 also may be adapted for other specific kinds of installations employing threads or other connectors (not shown).

To assemble the ball-joint 8, a Belleville washer 22 sized to fit within the central bore 12 is seated against the closed posterior end 14. When the components of the suspension joint are assembled, the Belleville washer 22 provides resilient axial compliance. Next, a lower bearing 24 sized to fit within central bore 12 is seated within housing 10. The lower bearing 24 includes a central bore 26 axially aligned with a vertical axis VA of the housing, and an outer surface 28 of lower bearing 24 is designed to correspond to the curvature of interior of the central bore 12.

A stud 30 having a generally cylindrical body 32 and an enlarged spherical head 34 is placed in the central bore 12, such that the spherical head 34 engages a corresponding hemispherical inner surface 36 of the bearing 24 seated within the housing 10. The body 32 of the stud 30 includes a neck portion 38 adjacent the spherical head 34, a central portion 40, and an upper portion 42 of a narrow uniform diameter. The neck portion 38 is sized to fit within the central bore 12 of housing 10, with the central portion 40 and upper portion 42 extending through the open anterior end 16, externally of housing 10. To secure the spherical head 34 within the housing 10, a second, or upper bearing 44 is seated in the central bore 12, having a curved inner surface 46 which surrounds a portion of the spherical head 34 adjacent the neck portion 38. A reduced thickness annular region 47 of the housing 10 is then rolled or swagged inward to retain the upper bearing 44 within the central bore 12, securing the stud 30 in place. Finally, a dust boot 48 is secured about the exposed portion of the stud 30 to the housing 10.

Figure 2:
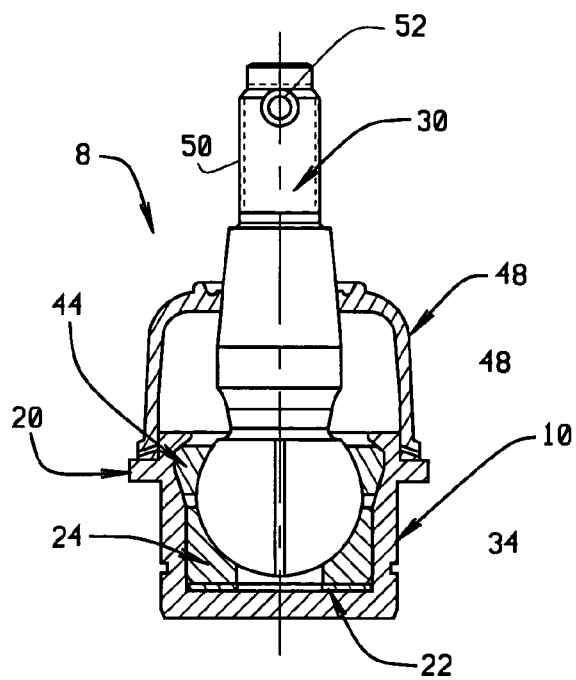
FIG. 2 is an assembled section view of the ball and socket joint of FIG. 1.

When assembled, as illustrated in FIG. 2, the spherical head 34 seated between the lower bearing 24 and the upper bearing 44 provides for a limited range of conical movement of stud 30. Those skilled in the art will readily recognize that numerous shapes and configurations for housing 10 and stud 30 are possible, together with associated configurations of bearings 24 and 44, depending upon the particular application for which the suspension joint 8 is intended. For example, the stud 30 may include a hemispherical, conical, or cylindrical head, or the cylindrical body may include threads 50, bores as at 52, or grooves for attachment of external components (not shown).

As indicated above, those skilled in the art will recognize that the various internal components of the suspension joint 8 secured within the housing 10 may be varied in size and shape depending upon the particular application for which the suspension joint 8 is designed, and accordingly, the above described ball-joint 8 is merely exemplary of one embodiment in which a bearing of the present invention may be utilized.

Figure 3:
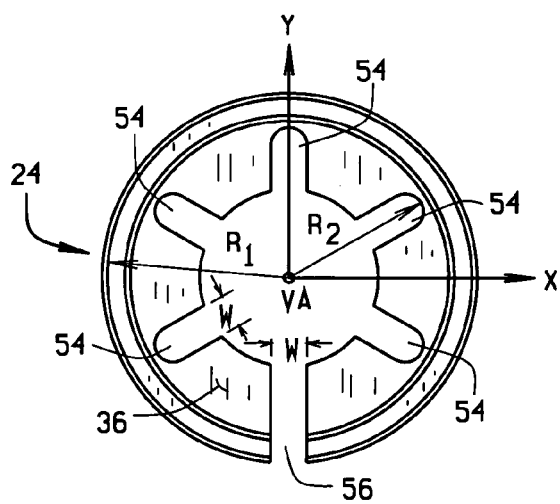
FIG. 3 is a top view of a conventional slotted bearing.

Turning to FIG. 3, a top plan view of a conventional lower bearing 24 is shown.

The bearing 24 is generally annular, having an outer radius R1 sized to seat within the central bore 12 of the housing 10. The hemispherical shaped inner surface 36 is interrupted by a number of uniformly sized radial slots 54, and a discontinuity 56. Each slot 54, and the discontinuity 56, has an identical radial depth R2, and an identical width W, and is equidistantly spaced in a uniform pattern about the axis VA of the bearing 24.

Figure 4:
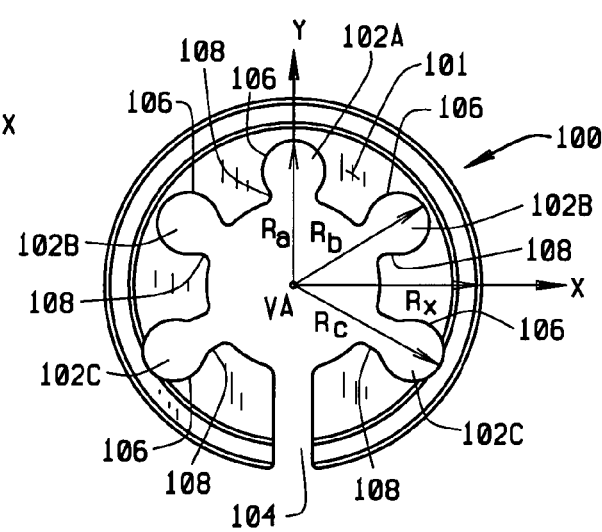
FIG. 4 is a top view of a slotted bearing of the present invention.

Turning to FIG. 4, an improved lower bearing 100 of the present invention for replacement of lower bearing 24 in suspension joint 8 is shown in a top plan view. The bearing 100 defines an annular body having an outer radial dimension Rx sized to seat within the central bore 12 of the housing 10, such that the bearing 100 is locked against radial or rotational movement within the central bore 12, but movable in the axial direction along axis VA after assembly of the suspension joint 8. As shown in FIG. 4, the inner surface 101 of the bearing 100 preferably includes five radial slots, designated generally by 102 as well as a break or discontinuity 104 in the bearing annular body 100. With the discontinuity 104 aligned with the Y-axis, the radial slots 102 and discontinuity 104 are symmetrically disposed about the Y-axis.

Preferably, the radial slots 102 on each side of a plane bisecting the bearing 100 from top to bottom along the Y-axis are mirror images. Each radial slot 102 on one side of the Y-axis plane has a unique radial dimension, such that no more than two radial slots 102 in the bearing 100 have identical radial dimensions.

Preferably, radial slot 102A has a radial dimensions of Ra, radial slots 102B on opposite sides of the Y-axis plane each have a radial dimension Rb, where Rb>Ra, and radial slots 102C on opposite sides of the Y-axis plane, each axially opposite a radial slot 102B, each have a radial dimension Rc, where Rc>Rb. The discontinuity 104 in the bearing 100 is disposed axially opposite from radial slot 102A, and provides a complete break in the annular configuration of the bearing 100.

As shown in FIG. 4, preferably each radial slot 102A, 102B, and 102C is preferably non-uniform in size, having a generally enlarged end portion 106 with a circular cross-section, and a reduced width neck portion 108, selected to minimize stresses and stiffness in the bearing 100 associated with the radial slots 102 while maintaining adequate bearing to stud contact. Those of ordinary skill in the art will recognize that the specific shape of each radial slot 102 may be varied from that shown in FIG. 4, and that the slots may be constructed of a uniform width along their radial dimension, or have an end portion 106 having a diameter equal to the width of the neck portion 108. Correspondingly, the number of radial slots 102 in the bearing 100 is not limited to five, but rather, may be any number greater than three. Radial slots 102 and optional discontinuity 104 are disposed about the inner surface 101 of the bearing 100 such that stresses within the bearing are equally distributed. Preferably, opposite sides of the Y-axis of the bearing 100 are mirror images.

During assembly and operation of a suspension joint 8 utilizing a bearing 100 of the present invention, it can be seen that the stresses within the bearing 100 are minimized and evenly distributed around all of the slots 102, thereby decreasing fatigue and increasing wear life for the bearing 100. Similarly, the fit tolerance of the bearing 100 within the housing 10 is improved over the fit tolerance of conventional bearings 24, such that the bearing 100 is locked within the central bore 12 in a radial direction, but remains free to move axially within the central bore 12, such that axial compliance members 22 are operative to regulate axial movement of the stud 30.

Figure 5:
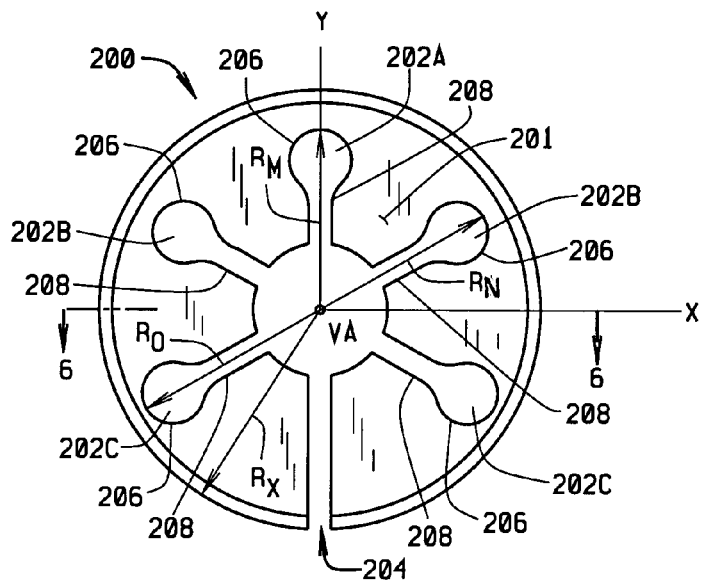
FIG. 5 is a top view of an alternate slotted bearing of the present invention.
Figure 6:
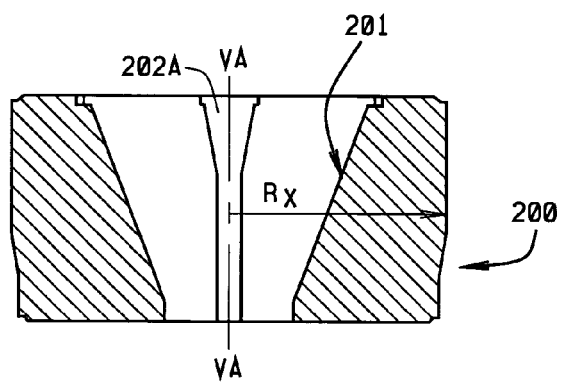
FIG. 6 is a sectional view of the bearing of FIG. 5.

Turning to FIG. 5, an alternate embodiment 200 of the lower bearing of the present invention for replacement of lower bearing 24 in suspension joint 8 is shown in a top plan view. The bearing 200 defines an annular body having an outer radial dimension Rx sized to seat within the central bore 12 of the housing 10, such that the bearing 200 is locked against radial or rotational movement within the central bore 12, but movable in the axial direction along axis VA after assembly of the suspension joint 8. As shown in FIG. 6, the inner surface 201 of the bearing 200 is generally conical, preferably includes five radial slots, designated generally by 202 as well as a break or discontinuity 204 in the bearing annular body 200. With the discontinuity 204 aligned with the Y-axis, the radial slots 202 are symmetrically disposed about the Y-axis.

Preferably, the radial slots 202 on each side of a plane bisecting the bearing 200 from top to bottom along the Y-axis are mirror images. Each radial slot 202 on one side of the Y-axis plane has a unique radial dimension, such that no more than two radial slots 202 in the bearing 200 have identical radial dimensions.

Preferably, radial slot 202A has a radial dimension of Rm, radial slots 202B on opposite sides of the Y-axis plane each have a radial dimension Rn, where Rn>Rm, and radial slots 202C on opposite sides of the Y-axis plane, each axially opposite a radial slot 202B, each have a radial dimension Ro, where Ro>Rn. The discontinuity 204 in the bearing 200 is disposed axially opposite from radial slot 202A, and provides a complete break in the annular configuration of the bearing 200.

As shown in FIG. 5, preferably each radial slot 202A, 202B, and 202C is non-uniform in size, having a generally enlarged end portion 206 with a circular cross-section, and a reduced width neck portion 208, selected to minimize stresses and stiffness in the bearing 200 associated with the radial slots 202 while maintaining adequate bearing to stud contact. Those of ordinary skill in the art will recognize that the specific shape of each radial slot 202 may be varied from that shown in FIG. 5. Correspondingly, the number of radial slots 202 in the bearing 200 is not limited to five, but rather, may be any number greater than three. Radial slots 202 and optional discontinuity 204 are disposed about the inner surface 201 of the bearing 200 such that stresses within the bearing are equally distributed. Preferably, opposite sides of the Y-axis of the bearing 200 are mirror images.

During assembly and operation of a suspension joint 8 utilizing a bearing 200 of the present invention, it can be seen that the stresses within the bearing 200 are minimized and evenly distributed around all of the slots 202, thereby decreasing fatigue and increasing wear life for the bearing 200. Similarly, the fit tolerance of the bearing 200 within the housing 10 is improved over the fit tolerance of conventional bearings 24, such that the bearing 200 is locked within the central bore 12 in a radial direction, but remains free to move axially within the central bore 12, such that axial compliance members 22 are operative to regulate axial movement of the stud 30.

Figure 7:
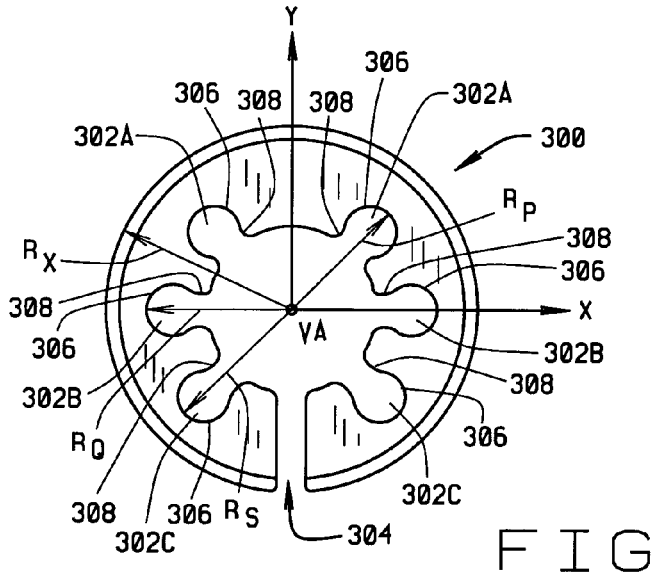
FIG. 7 is a top view a second alternate slotted bearing of the present invention.

Turning to FIG. 7, an alternate embodiment 300 of the lower bearing of the present invention for replacement of lower bearing 24 in suspension joint 8 is shown in a top plan view. The bearing 300 defines an annular body having an outer radial dimension Rx sized to seat within the central bore 12 of the housing 10, such that the bearing 300 is locked against radial or rotational movement within the central bore 12, but movable in the axial direction along axis VA after assembly of the suspension joint 8. The inner surface 301 of the bearing 200 either hemispherical, such as shown in bearing 100, or conical as shown in bearing 200, and preferably includes six radial slots, designated generally by 302 as well as a break or discontinuity 304 in the bearing annular body 300. With the discontinuity 304 aligned with the Y-axis, the radial slots 302 are disposed in mirror-image about the Y-axis plane, with each slot on one side of the Y-axis plane having a unique radial dimension, such that no more than two radial slots 302 in the bearing 300 have identical radial dimensions.

Preferably, radial slots 302A on opposite sides of the Y-axis each have a radial dimensions of Rp, radial slots 302B on opposite sides of the Y-axis each have a radial dimension Rq, where Rq>Rp, and radial slots 302C on opposite sides of the Y-axis, each axially opposite a radial slot 302A, each have a radial dimension Rs, where Rs>Rq. The discontinuity 304 in the bearing 300 is disposed on the Y-axis, and provides a complete break in the annular configuration of the bearing 300.

As shown in FIG. 7, preferably each radial slot 302A, 302B, and 302C is non-uniform in size, having a generally enlarge end portion 306 with a circular cross-section, and a reduced width neck portion 308, selected to minimize stresses and stiffness in the bearing 300 associated with the radial slots 302 while maintaining adequate bearing to stud contact. Those of ordinary skill in the art will recognize that the specific shape of each radial slot 302 may be varied from that shown in FIG. 7. Correspondingly, the number of radial slots 302 in the bearing 300 is not limited to six, but rather, may be any number greater than three. Radial slots 302 and optional discontinuity 304 are disposed about the inner surface 301 of the bearing 300 such that stresses within the bearing are equally distributed. Preferably, opposite sides of the Y-axis of the bearing 300 are mirror images.

During assembly and operation of a suspension joint 8 utilizing a bearing 300 of the present invention, it can be seen that the stresses within the bearing 300 are minimized and evenly distributed around all of the slots 302, thereby decreasing fatigue and increasing wear life for the bearing 300. Similarly, the fit tolerance of the bearing 300 within the housing 10 is improved over the fit tolerance of conventional bearings 24, such that the bearing 300 is locked within the central bore 12 in a radial direction, but remains free to move axially within the central bore 12, such that axial compliance members 22 are operative to regulate axial movement of the stud 30.

Preferably, bearings 100, 200, 300 are formed from a powdered metal using a conventional sintering process, however, those of ordinary skill in the art will recognize that the inventive features of the present invention may be utilized with any of a variety of bearing materials conventionally utilized in movable sockets or suspension joints, such as formed metals or plastics. Furthermore, those of ordinary skill will recognize that the present invention is not limited in application to lower bearings in a suspension joint, but may be utilized in upper bearings as well.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A suspension joint for a vehicle comprising:
   a ball joint stud having a convex semi-spherical stud head;
   a housing for receiving said stud head for articulated movement therein, said housing having a central bore;
   a bearing body defining a central axis and disposed between said housing and said stud head for establishing a sliding interface therebetween; said bearing body being nested in said central bore and a concave semi-spherical inner surface for directly engaging said stud head;
   said bearing body including a discontinuity extending generally radially through said bearing body and axially along the entire length of said bearing body; and
   said bearing body further including at least three radial slots extending radially outwardly from said inner surface to a termination point embedded within said bearing body, each of said radial slots having a distinct radial depth as measured from said central axis to said termination point, such that no more than two of said radial slots have an identical radial depth.

2. The suspension joint of claim 1 wherein said at least three radial slots consists of exactly five radial slots, a first one of said five radial slots disposed radially opposite from said discontinuity, and the remaining four of said five radial slots arcuately spaced 60° from at least one adjacent said radial slot.

3. The suspension joint of claim 2 wherein said first one of said five radial slots has a first radial depth that is shorter than the radial depth of each of said remaining four of said five radial slots.

4. The suspension joint of claim 2 wherein each of said radial slots proximate said fist one of said five radial slots has a radial depth that is shorter than the radial depth of each of said radial slots proximate said discontinuity.

5. The suspension joint of claim 1 wherein said bearing body is secured in said housing against radial movement.

6. The suspension joint of claim 1 wherein said bearing body is secured in said housing against rotational movement.

7. The suspension joint of claim 1 wherein said bearing body is movable in an axial direction within said housing.

8. The suspension joint of claim 1 wherein said at least three radial slots consists of exactly six radial slots.

9. The suspension joint of claim 8 wherein said six radial slots are arranged in three pairs consisting of two slots each, a first pair of said six radial slots each having an equivalent first radial depth, a second pair of said six radial slots each having an equivalent second radial depth that is different than said first radial depth, and a third pair of said six radial slots each having an equivalent third radial depth that is different than said first and second radial depths.

10. The suspension joint of claim 9 wherein said first radial depth is shorter than said second radial depth; and wherein said second radial depth is shorter than said third radial depth.

11. The suspension joint of claim 8 wherein an imaginary axial plane passing through said central axis and said discontinuity bisects said bearing body into first and second mirror image portions; and wherein said six radial slots are arranged in three pairs of two identical radial slots each, one of each pair of said two identical radial slots disposed in said first mirror image portion and the other of each pair of said two identical radial slots disposed in said second mirror image portion.

12. The suspension joint of claim 1 wherein said radial slots are symmetrically disposed relative to one another about said central axis of said bearing body.

13. The suspension joint of claim 1 wherein said bearing body has a generally annular exterior configuration, and wherein an imaginary axial plane passing through said central axis and said discontinuity bisects said annular bearing body into first and second mirror image portions.

14. The suspension joint of claim 1 wherein one of said at least three radial slots located proximate said discontinuity has a radial depth that is longer than the radial depth of another one of said at least three radial slots located distal from said discontinuity.

15. The suspension joint of claim 1 wherein each of said at least three radial slots includes an enlarged end portion adjacent said termination point and a reduced-width neck portion extending between said enlarged end portion and said inner surface, said reduced-width neck portion having a width less than a width of said enlarged end portion.

16. The suspension joint of claim 15 wherein each of said enlarged end portions has a circular cross section.

17. The suspension joint of claim 16 wherein each of said enlarged end portions is dimensionally identical to the other of said enlarged end portions.

* * * * *